(12) United States Patent
Yang

(10) Patent No.: US 7,116,482 B2
(45) Date of Patent: Oct. 3, 2006

(54) JUNCTION LENS DEVICE, ZOOM LENS OPTICAL SYSTEM EMPLOYING SAME, AND CAMERA EMPLOYING THE ZOOM LENS OPTICAL SYSTEM

(75) Inventor: Jin-Oh Yang, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/730,288

(22) Filed: Dec. 9, 2003

(65) Prior Publication Data
US 2004/0212902 A1    Oct. 28, 2004

(30) Foreign Application Priority Data
Dec. 10, 2002 (KR) ............... 10-2002-0078163

(51) Int. Cl.
*G02B 1/10* (2006.01)
*B05D 5/06* (2006.01)
(52) U.S. Cl. ............ 359/581; 359/586; 427/162

(58) Field of Classification Search .......... 359/581, 359/586–588; 351/163; 427/162, 163.1, 427/164–169
See application file for complete search history.

(56) References Cited

U.S. PATENT DOCUMENTS 4,609,267 A * 9/1986 Deguchi et al. ............ 351/163

* cited by examiner

*Primary Examiner*—Loha Ben
*Assistant Examiner*—Jack Dinh
(74) *Attorney, Agent, or Firm*—Roylance, Abrams, Berdo & Goodman, L.L.P.

(57) ABSTRACT

A junction lens device is made by joining a high refractive lens and a low refractive lens using an adhesive. A coating layer for index matching is formed on a surface of at least one of the high refractive lens and the low refractive lens contacting the adhesive to reduce a reflection ratio on a junction surface. The coating layer is formed such that a reflection ratio on the junction surface with respect to a visible light ray is not more than about 0.2%.

19 Claims, 5 Drawing Sheets

JUNCTION LENS DEVICE, ZOOM LENS OPTICAL SYSTEM EMPLOYING SAME, AND CAMERA EMPLOYING THE ZOOM LENS OPTICAL SYSTEM

BACKGROUND OF THE INVENTION

This application claims the priority of Korean Patent Application No. 2002-78163, filed on Nov. 10, 2002, in the Korean Intellectual Property Office, the disclosure of which is incorporated herein in its entirety by reference.

1. Field of the Invention

The present invention relates to a junction lens device made by joining a high refractive lens and a low refractive lens, a zoom lens optical system employing the junction lens device, and a camera employing the zoom lens optical system.

2. Description of the Related Art

A zoom lens optical system for camcorders or digital still cameras has been developed to be compact while having a high resolution. To meet this trend, use of a junction lens device made by joining a high refractive lens and a low refractive lens is necessary. This is because aberrations, such as high-order chromatism, generated on an off-axis due to magnification chromatism can be minimized by using the junction lens device.

FIG. 1 is a view illustrating a conventional double junction lens device. Referring to FIG. 1, a conventional double junction lens device 1 is made by joining a high refractive lens 3 and a low refractive lens 5 using an adhesive. When external light is incident on the double junction lens device 1, a reflection ratio on a high refractive junction surface 3a is about 1.18% which is very high.

Thus, when the conventional double junction lens device 1 is used as a front lens of a zoom lens optical system, a large amount of flare and/or ghost is generated by the light reflected by the high refractive junction surface 3a.

SUMMARY OF THE INVENTION

To solve the above and/or other problems, the present invention provides a junction lens device which can significantly reduce a reflection ratio on a junction surface of a high refractive lens and a low refractive lens, a zoom lens optical system employing the junction lens device, and a camera employing the zoom lens optical system.

According to an aspect of the present invention, there is provided a junction lens device made by joining a high refractive lens and a low refractive lens using an adhesive, wherein a coating layer for index matching is formed on a surface of at least one of the high refractive lens and the low refractive lens contacting the adhesive to reduce a reflection ratio on a junction surface.

The coating layer is formed such that a reflection ratio on the junction surface with respect to a visible light ray is not more than about 0.2%.

According to another aspect of the present invention, a junction lens device made by joining a high refractive lens and a low refractive lens using an adhesive, wherein a coating layer is formed on a surface of at least one of the high refractive lens and the low refractive lens contacting the adhesive so that a reflection ratio on a junction surface with respect to a visible light ray is not more than about 0.2%.

A difference in refractive index between the high refractive lens and the low refractive lens is preferably not less than about 0.15.

According to another aspect of the present invention, a zoom lens optical system including at least one junction lens device made by joining a high refractive lens and a low refractive lens using an adhesive, wherein in the junction lens device a coating layer for index matching is formed on a surface of at least one of the high refractive lens and the low refractive lens contacting the adhesive to reduce a reflection ratio on a junction surface.

According to another aspect of the present invention, a zoom lens optical system includes at least one junction lens device made by joining a high refractive lens and a low refractive lens using an adhesive, wherein in the junction lens device a coating layer is formed on a surface of at least one of the high refractive lens and the low refractive lens contacting the adhesive so that a reflection ratio on a junction surface with respect to a visible light ray is not more than about 0.2%.

According to another aspect of the present invention, a camera includes a zoom lens optical system, wherein the zoom lens optical system comprises at least one junction lens device made by joining a high refractive lens and a low refractive lens using an adhesive and, in the junction lens device, a coating layer for index matching is formed on a surface of at least one of the high refractive lens and the low refractive lens contacting the adhesive to reduce a reflection ratio on a junction surface.

According to another aspect of the present invention, a camera includes a zoom lens optical system, wherein the zoom lens optical system comprises at least one junction lens device made by joining a high refractive lens and a low refractive lens using an adhesive and, in the junction lens device, a coating layer is formed on a surface of at least one of the high refractive lens and the low refractive lens contacting the adhesive so that a reflection ratio on a junction surface with respect to a visible light ray is not more than about 0.2%.

The camera is preferably capable of photographing a motion picture and/or a still picture.

BRIEF DESCRIPTION OF THE DRAWINGS

The above and other features and advantages of the present invention will become more apparent by describing in detail preferred embodiments thereof with reference to the attached drawing figures in which.

DETAILED DESCRIPTION OF THE PREFERRED EMBODIMENT

Figure 1:
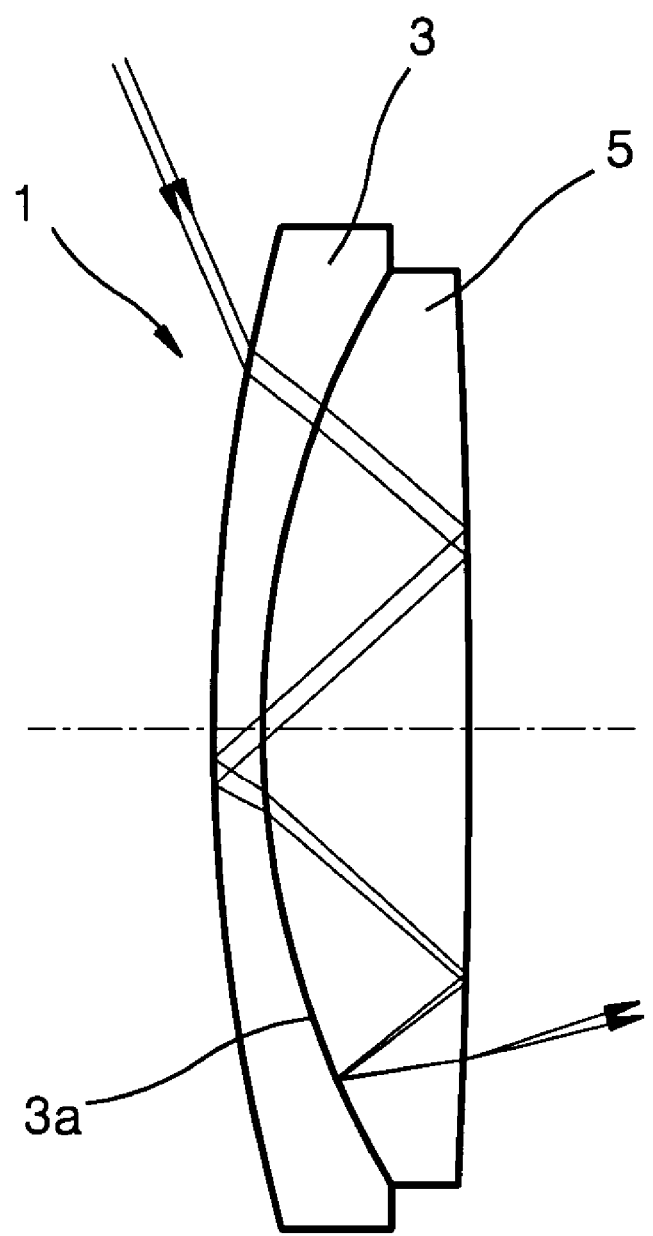
FIG. 1 is a view illustrating a conventional double junction lens device.
Figure 2:
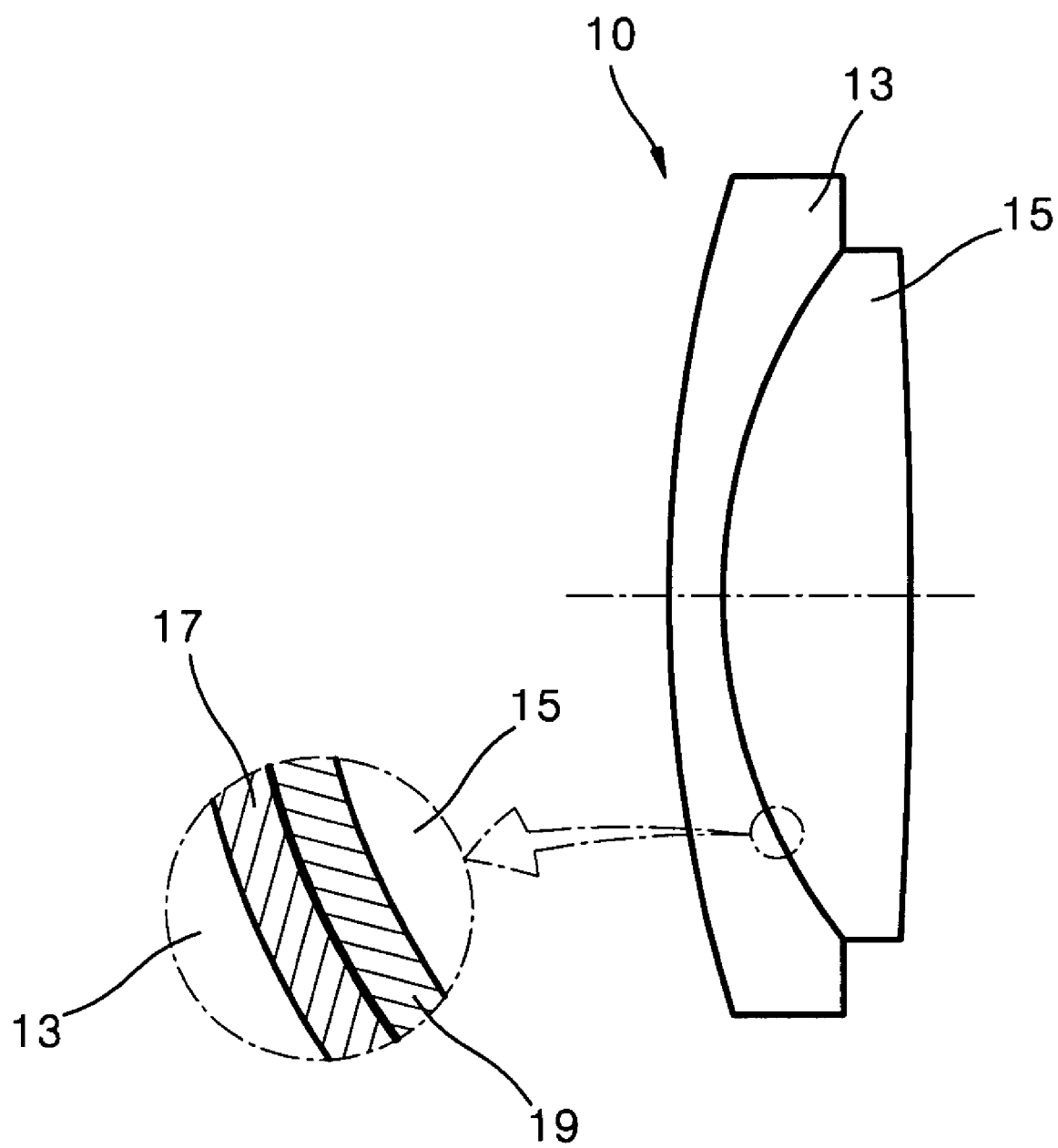
FIG. 2 is a view illustrating a junction lens device according to an embodiment of the present invention.
Figure 3:
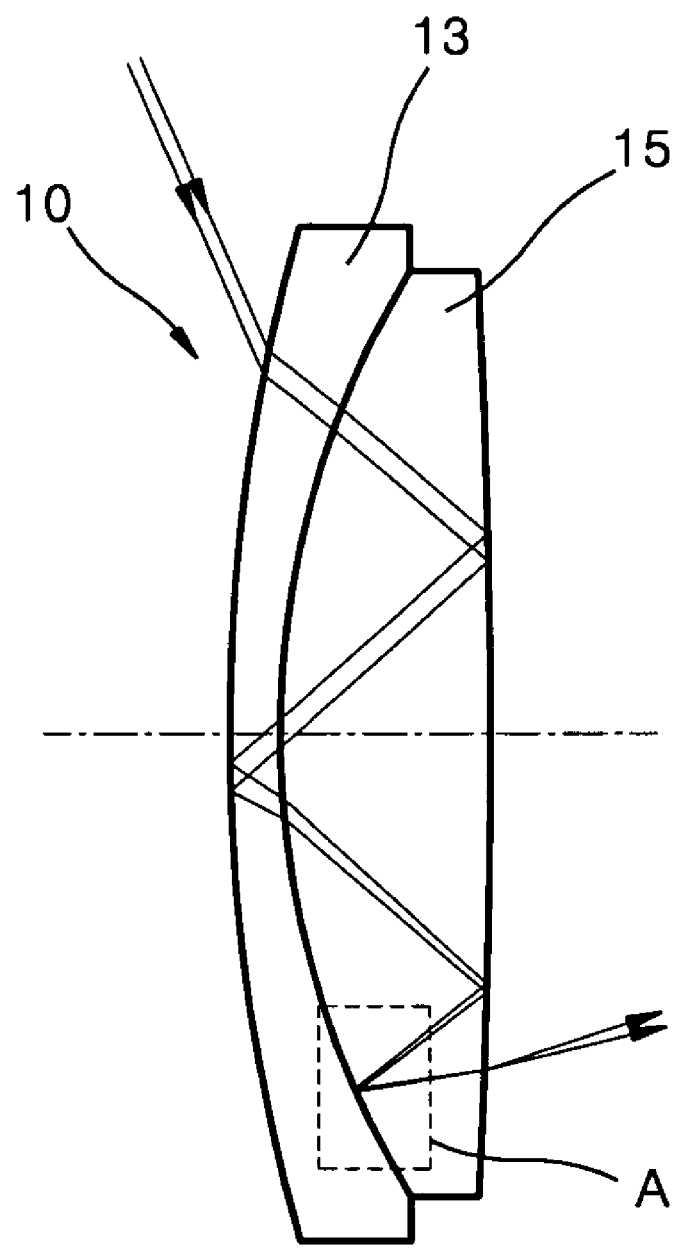
FIG. 3 is a view illustrating an optical path of external light by refraction, transmission, and reflection when the external light is incident on the junction lens device of FIG. 2.

FIG. 2 shows a double junction lens device as a preferred embodiment of a junction lens device according to the present invention. Referring to FIGS. 2 and 3, a junction lens device 10 according to a preferred embodiment of the present invention is made by joining a high refractive lens 13 and a low refractive lens 15 using an adhesive 19. A coating layer 17 is formed on a surface contacting the adhesive 19 of at least one of the high refractive lens 13 and a lower refractive lens 15 so that a reflection ratio on a junction surface can be reduced.

In FIG. 3, an area A shows a position where flare and/or ghost is generated as external incident light is reflected by the junction surface. According to the junction lens device 10 of an embodiment of the present invention, since the reflection ratio on the junction surface is very low, the flare and/or ghost is hardly generated in the area A.

In the junction lens device 10 according to an embodiment of the present invention, a difference in refractive index between the high refractive lens 13 and the low refractive lens 15 is preferably not less than about 0.15.

The junction lens device 10 according to a preferred embodiment of the present invention is made by irradiating an ultraviolet light ray to the junction lens device 10 in which the adhesive 19 in a liquid state adheres between the high refractive lens 13 and a low refractive lens 15 so that the adhesive 19 is hardened by UV bonding.

When a refractive index in a state in which the adhesive 19 is hardened is similar to a refractive index of the low refractive lens 15, the coating layer 17 is preferably formed on the high refractive lens 13 as shown in FIGS. 2 and 3.

For example, the low refractive lens 15 may have a refractive index of about 1.5 and the high refractive lens 13 may have a refractive index of, for example, about 1.9, higher than that of the low refractive lens 15. The adhesive 19 used to join the high refractive lens 13 and the low refractive lens 15 may have a refractive index of about 1.51. In this case, the coating layer 17 to lower the reflection ratio on the junction surface is preferably formed on the high refractive lens 13.

The specification of the coating layer 17 can be determined based on an index matching theory. That is, the coating layer 17 is preferably coated on a surface of the high refractive lens 13 facing the low refractive lens 15 so that index matching is available.

When the refractive index of the high refractive lens 13 is ns and the refractive index of the adhesive 19 is no, the refractive index no for the index matching can be obtained by Equation 1.

$$ni = \sqrt{ns \cdot no}$$ [Equation 1]

Thus, it is preferable that, for example, when the refractive index ns of the high refractive lens 13 is about 1.9 and the refractive index no of the adhesive 19 is about 1.51, the refractive index ni of the coating layer 17 is about 1.7.

Figure 4:
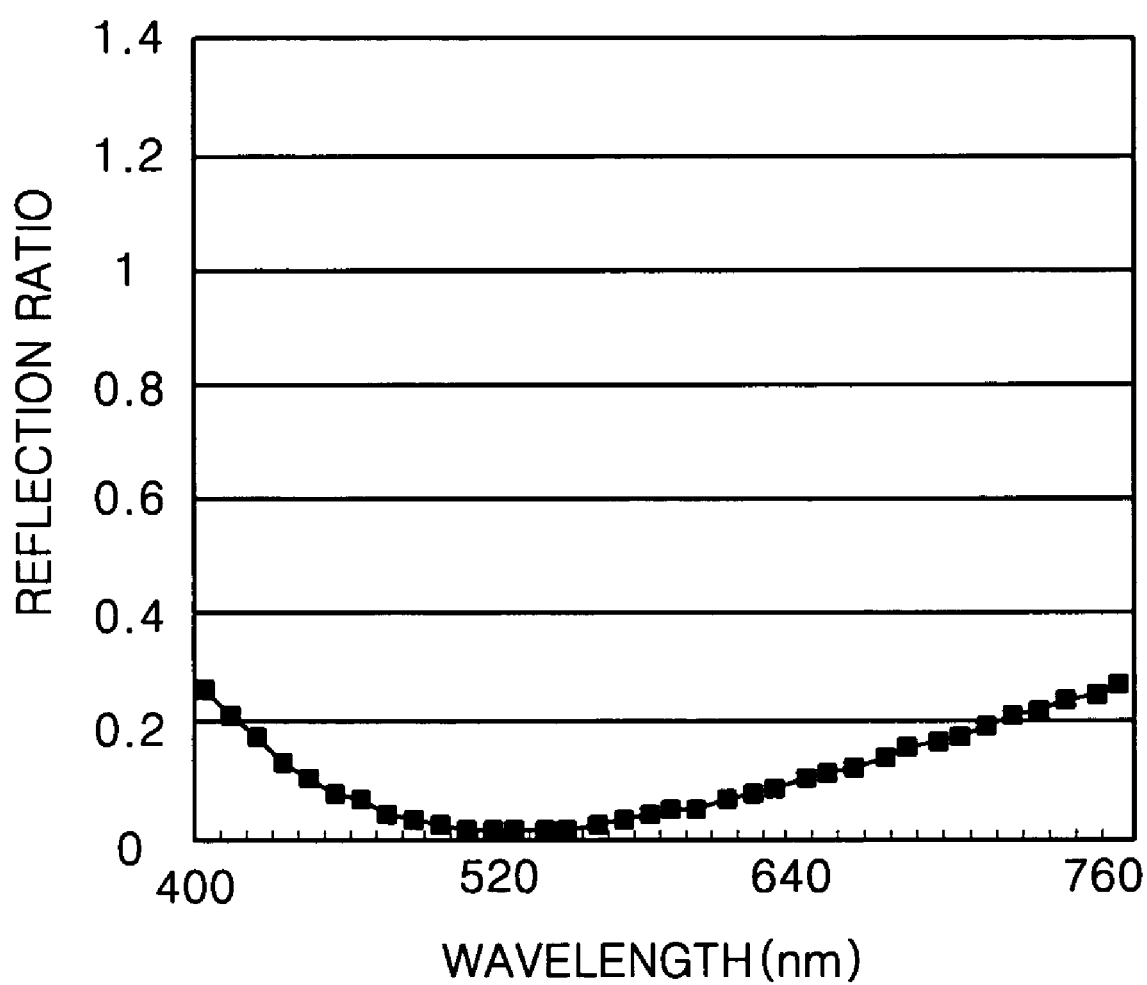
FIG. 4 is a graph showing a feature of reflection ratio according to a wavelength on a junction surface of the junction lens device of FIG. 2.

When the junction lens device 10 according to the present preferred embodiment of the present invention is configured to have the above refractive index conditions, a refractive index feature on the junction surface according to a wavelength is shown in FIG. 4.

As shown in FIG. 4, in the junction lens device 10 according to a preferred embodiment of the present invention, when the coating layer 17 is formed to meet the index matching conditions, the reflection ratio on the junction surface between the high refractive lens 13 and the low refractive lens 15 can be about 0.02% at its minimum with respect to a particular wavelength. Thus, the reflection ratio on the junction surface between the high refractive lens 13 and the low refractive lens 15 can be reduced by about 1.16% compared to the reflection ratio of about 1.18% on the junction surface of the conventional double junction lens device. Also, the reflection ratio on the junction surface is not more than about 0.2% with respect to the overall range of a visible light ray. The visible light ray is light which can be recognized by the human eye and the range of a wavelength thereof is about 460–650 nm.

As shown in FIG. 4, the junction lens device 10 according to an embodiment of the present invention can be formed such that the reflection ratio thereof on the junction surface in a range of a visible light ray is not more than about 0.2% and the minimum reflection ratio is about 0.02%.

According to the above-described embodiments of the present invention, since the reflection ratio on the junction surface between the high refractive lens 13 and the low refractive lens 15 can be reduced significantly, when the junction lens device is used as a front lens of a zoom lens optical system, the generation of flare and/or ghost can also be significantly reduced.

Although, in the above description and illustration, the junction lens device 10 according to an embodiment of the present invention has the coating layer 17 on the surface of the high refractive lens 13 contacting the adhesive 19, the present invention is not limited to the above description.

That is, considering the relationship between refractive indexes of the high refractive lens 13, a lower refractive lens 15, and the adhesive 19, for example, if the refractive indexes of the high refractive lens 13 and the adhesive 19 are similar to each other, the coating layer 17 to make index matching and/or the reflection ratio on the junction surface not more than about 0.2% with respect to a visible light ray is preferably formed on a surface of the low refractive lens 15 contacting the adhesive 19.

Also, if the refractive index of the adhesive 19 is not similar to that of any of the high refractive lens 13 and the low refractive lens 15, it is preferable to form the coating layer 17 to make index matching and/or the reflection ratio on the junction surface not more than about 0.2% with respect to a visible light ray, on the respective surfaces of the high and low refractive lenses 13 and 15 contacting the adhesive 19.

Accordingly, the junction lens device 10 according to an embodiment of the present invention includes at least one coating layer 17 which makes index matching and/or the reflection ratio on the junction surface not more than about 0.2% with respect to a visible light ray.

Also, although, in the above description and illustration, the junction lens device 10 according to an embodiment of the present invention includes two lenses, that is, the high refractive lens 13 and the low refractive lens 15, the present invention is not limited thereto. That is, the junction lens device according to the present invention can be configured with three or more lenses having a structure in which a high refractive lens and a low refractive lens are joined. For example, a junction lens device according to another embodiment of the present invention can have a structure in which a high refractive lens, a low refractive lens, and a high refractive lens are joined or a low refractive lens, a high refractive lens, and a low refractive lens are joined.

The junction lens device 10 according to an embodiment of the present invention can be applied to a zoom lens optical system and a camera adopting the zoom lens optical system as follows.

Figure 5:
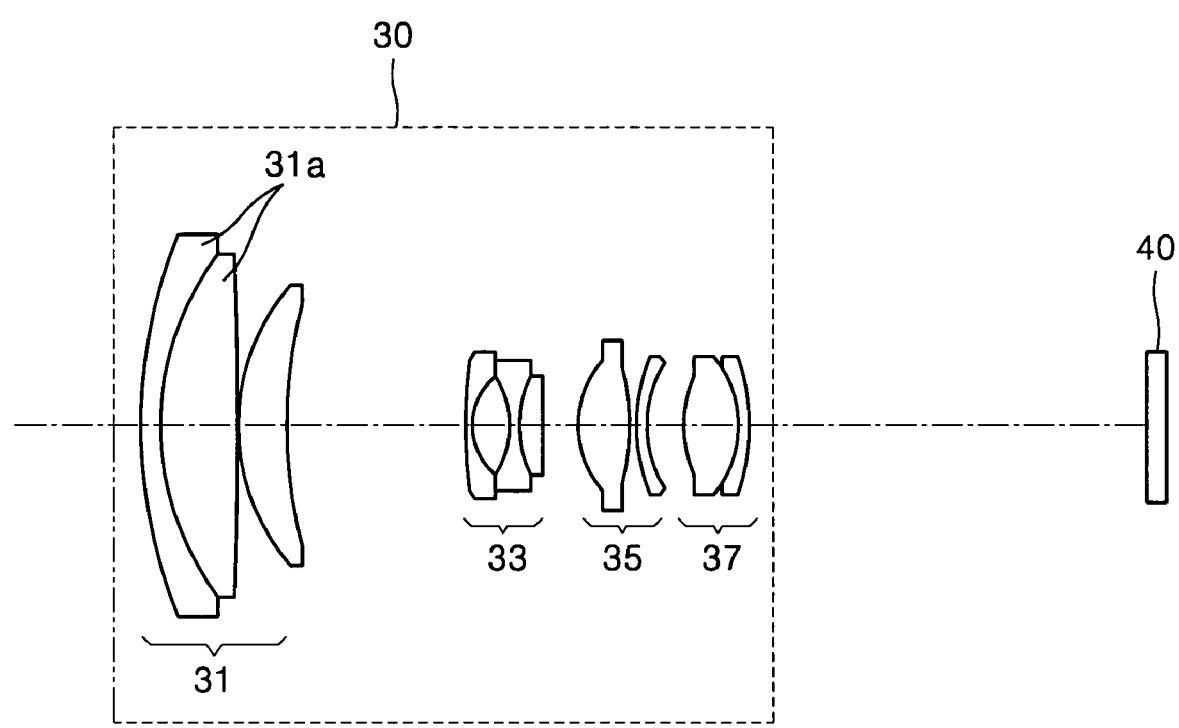
FIG. 5 is a view illustrating a zoom lens optical system and a camera adopting the junction lens device of FIG. 2.

FIG. 5 shows a preferred embodiment in which the junction lens device of FIG. 2 is applied to a zoom lens optical system and a camera. Referring to FIG. 5, a camera includes a zoom lens optical system 30 and a charge coupled device (CCD) 40.

The zoom lens optical system 30, for example, may include a front lens 31 made of three lenses functioning as an objective lens by receiving information from an object, a zoom lens 33 made of three lenses performing a zooming function, a relay lens 35 made of two lenses transmitting light and making a parallel light beam, and a focus lens 37 made of two lenses forming an image of the object on an image surface of the CCD 40.

The junction lens device 10 according to an embodiment of the present invention is preferably provided as a double junction lens device 31a of the front lens 31. When the junction lens device 10 according to an embodiment of the present invention is applied to the front lens 31, since a reflection ratio on a junction surface of the double junction lens device 31a is very small, generation of flare and/or ghost can be prevented.

In the zoom lens optical system 30, the junction lens device 10 according to an embodiment of the present invention can be provided as a double or multiple junction lens device for lenses other than the front lens 31, for example, the zoom lens 33 and/or the focus lens 37. When the junction lens device 10 according to an embodiment of the present invention is used as the front lens 31, the zoom lens 33, and/or the focus lens 37, since the reflection ratio on the junction surface is very low, transmittance can be increased.

When a camera adopting the zoom lens optical system 30 having the junction lens device 10 according to an embodiment of the present invention is a video camera, for example, a camcorder, a CCD capable of photographing a motion picture or a CCD capable of photographing both a motion picture and a still picture is provided as the CCD 40. When a camera adopting the zoom lens optical system 30 having the junction lens device 10 according to an embodiment of the present invention is a digital still camera, a CCD capable of photographing a still picture is provided as the CCD 40.

Also, the camera may further include a light splitting device (not shown) for splitting light between the zoom lens optical system 30 and the CCD 40 and further include a CCD (not shown). The two CCDs are used as a CCD for photographing a motion picture and a CCD for photographing a still picture so that a motion picture and a still picture can be simultaneously photographed. In this case, the camera may be, for example, a camcorder having a function of a digital still camera.

As described above, according to embodiments of the present invention, since reflection ratio on the junction surface of the junction lens device can be remarkably reduced, by using the junction lens device for the front lens of the zoom lens optical system, the generation of flare and/or ghost can be reduced while light transmittance can be increased.

While the present invention has been particularly shown and described with reference to preferred embodiments thereof, it will be understood by those skilled in the art that various changes in form and details may be made therein without departing from the spirit and scope of the invention as defined by the appended claims and equivalents thereof.

What is claimed is:

1. A junction lens device made by joining a first lens having a first refractive index and a second lens having a second refractive index using an adhesive having a third refractive index that is closer to the second refractive index than the first refractive index,
    wherein a coating layer having an index of refraction between the first refractive index and the third refractive index is formed on a surface of the first lens and wherein the adhesive is disposed between the coating layer and the second lens to reduce a reflection ratio on a junction surface.

2. The junction lens device as claimed in claim 1, wherein the coating layer has a refractive index selected such that a reflection ratio on the junction surface with respect to a visible light ray is not more than about 0.2%.

3. The junction lens device as claimed in claim 1, wherein a difference in refractive index between the first refractive index and the second refractive index is not less than about 0.15.

4. A zoom lens optical system including at least one junction lens device made by joining a first lens having a first refractive index and a second lens having a second refractive index using an adhesive having a third refractive index that is closer to the second refractive index than the first refractive index,
    wherein in the junction lens device a coating layer having an index of refraction between the first refractive index and the third refractive index is formed on a surface of the first lens and wherein the adhesive is disposed between the coating layer and the second lens to reduce a reflection ratio on a junction surface.

5. The zoom lens optical system as claimed in claim 4, wherein the coating layer has a refractive index selected such that a reflection ratio on the junction surface with respect to a visible light ray is not more than about 0.2%.

6. The zoom lens optical system as claimed in claim 4, wherein a difference in refractive index between the first refractive index and the second refractive index is not less than about 0.15.

7. The zoom lens optical system as claimed in claim 4, further comprising a front lens for receiving information from an object, a zoom lens performing a zooming function, and a focus lens for forming an image, wherein the junction lens device is used for at least one of the front lens, the zoom lens, and the focus lens.

8. A zoom lens optical system including at least one junction lens device made by joining a first lens having a first refractive index and a second lens having a second refractive index using an adhesive having a third refractive index that is closer to the second refractive index than the first refractive index,
    wherein in the junction lens device a coating layer having an index of refraction between the first refractive index and the third refractive index is formed on a surface of the first lens and wherein the adhesive is disposed between the coating layer and the second lens so that a reflection ratio on a junction surface with respect to a visible light ray is not more than about 0.2%;
    wherein a difference in refractive index between the first refractive index and the second refractive index is not less than about 0.15.

9. The zoom lens optical system as claimed in claim 8, further comprising a front lens for receiving information from an object, a zoom lens performing a zooming function, and a focus lens for forming an image, wherein the junction lens device is used for at least one of the front lens, the zoom lens, and the focus lens.

10. A camera including a zoom lens optical system, wherein the zoom lens optical system comprises at least one junction lens device made by joining a first lens having a first refractive index and a second lens having a second refractive index using an adhesive having a third refractive index that is closer to the second refractive index than the first refractive index and, in the junction lens device, a coating layer having an index of refraction between the first refractive index and the third refractive index is formed on a surface of the first lens and wherein the adhesive is disposed between the coating layer and the second lens to reduce a reflection ratio on a junction surface.

11. The camera as claimed in claim 10, wherein the coating layer has a refractive index selected such that a reflection ratio on the junction surface with respect to a visible light ray is not more than about 0.2%.

12. The camera as claimed in claim 10, wherein a difference in refractive index between the first refractive index and the second refractive index is not less than about 0.15.

13. The camera as claimed in claim 10, wherein the zoom lens optical system further comprises a front lens for receiving information from an object, a zoom lens for forming an image, and a focus lens performing a focusing function, and the junction lens device is used for at least one of the front lens, the zoom lens, and the focus lens.

14. A camera including a zoom lens optical system, wherein the zoom lens optical system comprises at least one junction lens device made by joining a first lens having a first refractive index and a second lens having a second refractive index using an adhesive having a third refractive index that is closer to the second refractive index than the first refractive index and, in the junction lens device, a coating layer having an index of refraction between the first refractive index and the third refractive index is formed on a surface of the first lens and wherein the adhesive is disposed between the coating layer and the second lens so that a reflection ratio on a junction surface with respect to a visible light ray is not more than about 0.2%;
wherein a difference in refractive index between the first refractive index and the second refractive index is not less than about 0.15.

15. The camera as claimed in claim 14, wherein the zoom lens optical system further comprises a front lens for receiving information from an object, a zoom lens performing a zooming function, and a focus lens for forming an image, and the junction lens device is used for at least one of the front lens, the zoom lens, and the focus lens.

16. A method of manufacturing a junction lens device comprising the steps of:
forming a coating layer on a first lens having a first refractive index; and
joining said first lens to a second lens having a second refractive index with an adhesive disposed between said coating layer and said second lens;
wherein said adhesive has a refractive index closer to the second refractive index than said first refractive index, and said coating layer has a refractive index between the first refractive index and the refractive index of the adhesive.

17. The method of claim 16, wherein said adhesive has a refractive index substantially similar to the second refractive index.

18. The method of claim 16, wherein the refractive index of the coating layer is substantially equal to the square root of the product of the refractive index of the adhesive and the first refractive index.

19. A junction lens device manufactured using the method of claim 16.

* * * * *